United States Patent [19]

Sasano

[11] 3,974,704

[45] Aug. 17, 1976

[54] TUNER MECHANISM

[75] Inventor: Mitsuharu Sasano, Sagamihara, Japan

[73] Assignee: Toyo Musen Co. Ltd., Tokyo, Japan

[22] Filed: May 29, 1975

[21] Appl. No.: 581,878

[30] Foreign Application Priority Data

Nov. 6, 1974 Japan ........................ 49-134364[U]

[52] U.S. Cl. ............................... 74/10.33; 74/10.31; 74/10.27

[51] Int. Cl.$^2$ ........................................ F16H 35/18

[58] Field of Search .............. 74/10 R, 10.33, 10.31, 74/10.29, 10.35, 10.27; 334/7

[56] References Cited

UNITED STATES PATENTS

| | | | |
|---|---|---|---|
| 2,335,812 | 11/1943 | Staffens | 74/10.29 |
| 2,811,045 | 10/1957 | Thompson | 74/10.33 |
| 3,192,781 | 7/1965 | Lyon, Jr. | 74/10.31 |
| 3,532,000 | 10/1970 | Williams | 74/10.33 |
| 3,635,097 | 1/1972 | Mears | 74/10.33 |

*Primary Examiner*—Samuel Scott
*Assistant Examiner*—Randall Heald
*Attorney, Agent, or Firm*—Bruce L. Birchard

[57] ABSTRACT

Accuracy and reproducibility of tuning with a low-cost mechanism in minimum space is achieved by a pair of flat, tapered-notch coupling members each being spring biased into firm engagement with the driving member at the opposite extremities thereof and with pins in guide slits of a driven member at the opposite extremities thereof, the slits preventing undesired displacement of the driving member at right angles to its intended motion and the combination of tapered slots and spring biasing preventing inaccurate displacement of the driving and driven members in the direction of intended motion thereof.

10 Claims, 2 Drawing Figures

TUNER MECHANISM

BACKGROUND OF THE INVENTION

1. Field of the invention

This invention relates to tuners and more particularly to pushbutton tuners for radio receivers.

2. Description of the Prior Art

One of the problems of core tuning mechanisms used in pushbutton radios, specifically in pushbutton car radios, is that, because of mechanical tolerances in the construction of the tuner mechanism, the positioning of the core with respect to the coil that it tunes is not consistent as between successive operations of the same pushbutton. This inconsistency results from two types of undesirable shifts in the relative positions of cooperating components as a result of operation of the pushbuttons. Those shifts can be in the direction of the desired slug or core motion and at right angles to the desired core motion. The first shift results in the ferrite core's being inserted a lesser or greater distance than is proper for the tuning of the circuit, including the coil, to the desired frequency. The lateral inaccuracy in core or slug positioning results in mechanical binding of the core with the coil form and a change in the tuning of the circuit including that coil for a given pushbutton setting.

Methods have been devised for reducing inaccurate positioning of the core in the direction of intended motions, thereof. For example, a spring has been inserted between the core frame, or driven member, and the transfer frame, or driving member, to keep the separation of certain points on those members fixed despite relative motion of those members. However, such a method does not prevent lateral displacement of the core frame and, thus, does not assure accurate reproducibility of tuning with repeated use of the same pushbutton.

SUMMARY OF THE INVENTION

It is one object of this invention to avoid the problems and disadvantages set forth, hereinbefore.

It is an additional object of this invention to provide pushbutton tuner for radio apparatus, or the like, which exhibits high degree of reproducibility of performance.

It is a still further object of the present invention to provide a pushbutton radio tuner which is compact and free of backlash.

Briefly stated, the present invention contemplates a pushbutton tuner in which the coupling between the core frame and the transfer frame is effected by a pair of flat, tapered notch coupling members engaging rounded elements in each of the core frame and transfer frame and at the respective extremities of both, the rounded elements of the core frame being within the confines of guide slits in the opposite extremities of the core frame, the coupling members moving with the core frame and being urged into contact with the rounded members by a spring held between the upper edge or boundary of the slit in each enlarged end member of the core frame and a tapered slot in the upper edge of each of the coupling members. Lateral motion of the core frame is prevented by the sides of the slits in the enlarged end members of the core frame, which end members are confined in their lateral motion, in turn, by the coil frame in which the core frame is supported. The coupling members with their sides cooperating with the sides of the slits is the enlarged end members, with their tapered lower slots cooperating with cylindrical members in the core frame and transfer frame and with their upper tapered slots cooperating with spring members which urge the coupling members toward the rounded members, tolerances, backlash and inaccuracies in tuner settings by the associated pushbuttons are eliminated.

BRIEF DESCRIPTION OF THE DRAWINGS

A better understanding of the present invention may be had from a consideration of the following description taken in connection with the accompanying drawings, in which:

In FIG. 1, coil frame 10 having a back portion 11 and side portions 9 and 13 forms the outer case of pushbutton tuner 12. Coils 14 are aligned on back portion 11 and supported fixedly therefrom. Side portions 9 and 13 have slots 18 and 16, respectively, therein aligned with each other. Core frame 20 has cross-bar 22 and enlarged end pieces 24 and 26 which may be integral with cross-bar 22. End piece 26 has guide stub 28 secured therein or integral therewith and extending into and cooperating slidably with slot 16. A similar guide stub, not shown, is carried by end piece 24 and cooperates slidably with slot 18. Cross-bar 22 the overall length of which is equal, approximately to the inner dimension of back portion 11, carries in adjustable fashion thereon tuning cores or slugs 30 in axial alignment with the central apertures 32 of coils 14. End pieces 24 and 26 of cross-bar 22 have slits 34 and 36 therein, respectively, parallel to end portions 9 and 13, respectively, as shown, each slit having a top wall and a pair of side walls.

Figure 1:
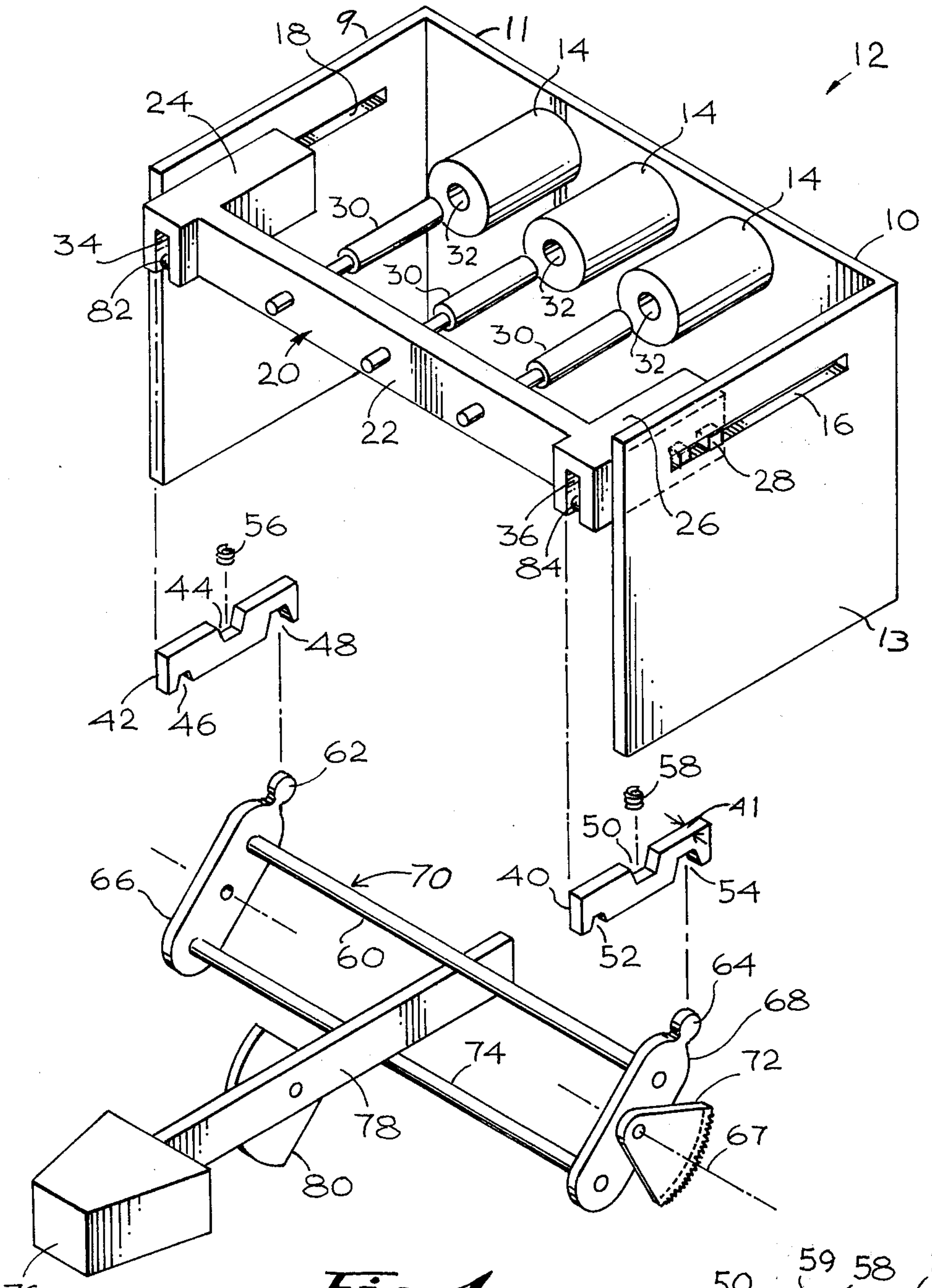
FIG. 1 is an isometric view, partially exploded, of a radio tuner incorporating the present invention; and, FIG. 2 is a cross-sectional view of a portion of the tuning mechanism of FIG. 1.

Coupling members 42 and 40 are identical in size and shape with each other. The width 41 of each coupling member is sightly less than the width of slits 34 and 36 so as to permit a sliding fit of each coupling member in its respective slit. Coupling member 42 has in it upper tapered slot 44 and lower tapered slots 46 and 48. Coupling member 40 has in it upper tapered slot 50 and lower tapered slots 52 and 54. Slots 44 and 50 are of the same size and shape, as are slots 46 and 52, and 48 and 54, respectively.

Figure 2:
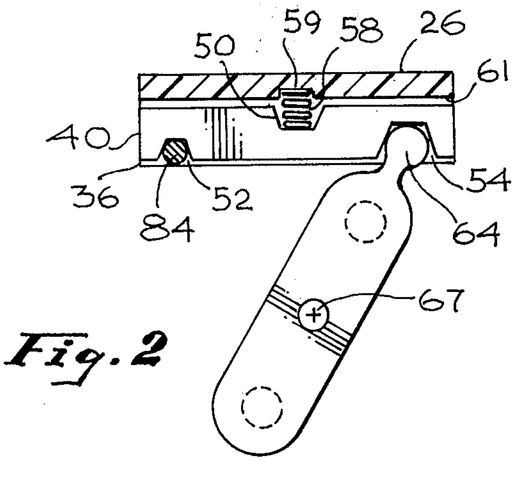

As can be seen more clearly in FIG. 2, slots 44 and 50 are sized and shaped to receive springs 56 and 58, respectively; and slots 48 and 54 are sized and shaped to cooperate with rounded projections 62 and 64 on end plates 66 and 68, respectively, of motion transfer frame 70. End plate 68 carries gear member 72 thereon for coupling to a manual tuning knob, shaft and gear, not shown.

Motion transfer rods 60 and 74 are of the same length, are cylindrical in shape, and are normal to and join end plates 66 and 68 of motion transfer frame 70.

Pushbutton 76 is joined to shaft 78 which has supported centrally thereon actuating cam 80. Shaft 78 is positioned to move centrally between transfer rods 60 and 74. The engagement of cam 80 with motion transfer rods 60 and 74 orients motion transfer frame 70 and positions cores 30 in coils 14, through the action of coupling members 42 and 40 and their cooperation with projections 62 and 64, respectively, and with round cylindrical pins 82 and 84, respectively, in end pieces 24 and 26, respectively.

In FIG. 2, rounded projection 64 on end plate 68 is shown engaging tapered notch 54 in coupling member 40. Tapered notch 52 is shown engaging cylindrical pin 84 in end piece 26. Spring 58 is received by recess 59 in the upper boundary 61 of slit 36 so as not to slip lengthwise with respect to that boundary. Spring 58 is compressed and engages tapered notch 50 so as to urge coupling member 40 into firm, but slipping engagement with cylindrical pin 84 and rounded projection 64. Thus, arcuate motion of end plate 68 about axis 67 is translated into linear motion of end piece 26 and the remainder of core frame 20. A similar structural and operational relationship between rounded projection 62 of end plate 66, coupling member 42, cylindrical pin 82 of end piece 24 and spring 56 results in a cooperating linear force upon end piece 24 and linear motion of core frame 20 in response to rotary motion of transfer frame 70, of which end plate 66 is a part.

Thus, springs 56 and 58 forcefully engaging the upper boundaries of slits 34 and 36 in end pieces 24 and 26, respectively, and upper tapered notches 44 and 50 in coupling members 42 and 40, respectively, cause the tapered notches in the coupling members 40 and 42 to firmly engage their associated cylindrical pins and rounded projections, eliminating undesirable backlash and inaccuracies in the motion and positioning of cores 30 in their intended direction of motion, i.e. into and out of coils 14. The walls of slits 34 and 36 cooperating with the sides of members 40 and 42 and with rounded projections 62 and 64, respectively; and the outer faces of end pieces 24 and 26 cooperating with end portions 9 and 13, respectively, prevent undesirable lateral displacement of core frame 20 (that is, displacement at right angles to the intended direction of motion of core frame 20).

While a particular embodiment of this invention has been shown and described it is to be understood that the invention is not limited thereto. Accordingly, any and all modifications, variations or equivalent arrangements which may occur to those skilled in the art should be considered to be within the scope of the invention as defined in the appended claims.

What is claimed is:

1. An improved tuner mechanism including:

a coil frame having a back portion and a pair of side portions supported from and separated by said back portion, each of said side portions having a guide slot therein normal to said back portion;

a core frame slidably supported between said side portions of said coil frame and having a cross-bar and a pair of end pieces at opposite ends of said cross-bar, said end pieces each having a guide stub on the outer surface thereof slidably engaging a respective one of said guide slots, each of said end pieces having, in addition, a slit therein parallel to an adjacent one of said side portions, said slit forming top and side walls in each of said end pieces;

a cylindrical pin supported in at least one of said side walls in each of said slits in a direction parallel to said cross-bar and movable in concert with said core frame;

a transfer frame supported rotatably between said end portions with its axis of rotation parallel to said cross-bar and having end plates interconnected by motion transfer rods, said end plates having rounded projections at corresponding ends therof, said transfer frame being supported with said rounded projections slidably positioned within respective ones of said slits;

a coupling member coupled between said transfer frame and said core frame for transferring motion therebetween, said coupling member having first and second lower tapered notches and an upper tapered notch, and being positioned in each of said slits with each of said first lower notches engaging one of said rounded projections and each of said second lower tapered notches engaging one of said cylindrical pins;

a spring positioned within each slit and having one end thereof in urging engagement with said upper wall of said slit and having the other end thereof in urging engagement with said upper tapered slot in a respective one of said coupling members, whereby each of said coupling members is urged into firm contact with one of said cylindrical pins and a corresponding one of said rounded projections and error in the positioning of said core frame by said transfer frame arising from mechanical tolerances in said coupling member are substantially eliminated; and transfer frame orienting means movable into engagement with said transfer rods for positioning said transfer frame and thereby, through said spring urged coupling member, accurately positioning said core frame.

2. Apparatus according to claim 1 in which the length of said core frame is approximately equal to the inner length of said back portion of said coil frame.

3. Apparatus according to claim 1 including, in addition, a plurality of cores adjustably positioned in said cross-bar for movement with said cross-bar.

4. Apparatus according to claim 3 including, in addition, a plurality of coils supported on said back portion in axial alignment with said cores.

5. Apparatus according to claim 1 in which said transfer frame orienting means includes a pushbutton, a shaft movable with said pushbutton and a cam supported on said shaft.

6. Apparatus according to claim 5 in which said shaft is positioned to move centrally between said transfer rods.

7. Apparatus according to claim 6 in which said cam is supported centrally on said shaft.

8. Apparatus according to claim 5 which includes, in addition, gear means supported on one of said end plates for producing continuous motion of said transfer frame.

9. Apparatus according to claim 5 which includes, in addition, a plurality of cores adjustably positioned in said cross-bar movement with said cross-bar, and a plurality of coils supported on said back portion in axial alignment with said cores.

10. Apparatus according to claim 2 which includes, in addition, a plurality of cores adjustably positioned in said cross-bar for movement therewith and a plurality of coils supported on said back portion in axial alignment with said cores.

* * * * *